United States Patent
Wang et al.

(10) Patent No.: US 10,534,972 B2
(45) Date of Patent: Jan. 14, 2020

(54) IMAGE PROCESSING METHOD, DEVICE AND MEDIUM

(71) Applicant: Xiaomi Inc., Beijing (CN)

(72) Inventors: Baichao Wang, Beijing (CN); Qiuping Qin, Beijing (CN); Wendi Hou, Beijing (CN)

(73) Assignee: XIAOMI INC., Haidian District, Beijing ( * ) Notice: Subject to any disclaimer, the term of this patent is extended or adjusted under 35 U.S.C. 154(b) by 196 days.

(21) Appl. No.: 15/368,663

(22) Filed: Dec. 4, 2016

(65) Prior Publication Data

US 2017/0161582 A1 Jun. 8, 2017

(30) Foreign Application Priority Data

Dec. 4, 2015 (CN) .......................... 2015 1 0886435

(51) Int. Cl.
| | | |
|---|---|---|
| G06K 9/20 | (2006.01) | |
| G06K 9/32 | (2006.01) | |
| G06K 9/46 | (2006.01) | |
| G06T 7/73 | (2017.01) | |
| H04N 5/232 | (2006.01) | |
| G06F 3/0484 | (2013.01) | |
| G06F 3/0488 | (2013.01) | |

(52) U.S. Cl.
CPC ......... *G06K 9/4604* (2013.01); *G06F 3/0488* (2013.01); *G06F 3/04842* (2013.01); *G06K 9/2081* (2013.01); *G06K 9/3241* (2013.01); *G06K 9/4671* (2013.01); *G06T 7/73* (2017.01); *H04N 5/232* (2013.01); *H04N 5/23222* (2013.01); *G06K 2209/21* (2013.01)

(58) Field of Classification Search
None
See application file for complete search history.

(56) References Cited

U.S. PATENT DOCUMENTS

| | | |
|---|---|---|
| 8,363,984 B1 | 1/2013 | Goldman |
| 2003/0025812 A1 | 2/2003 | Slatter |
| 2007/0223047 A1 | 9/2007 | Kameyama |

(Continued)

FOREIGN PATENT DOCUMENTS

| | | |
|---|---|---|
| CN | 102137271 A | 7/2011 |
| CN | 103854253 A | 6/2014 |

(Continued)

OTHER PUBLICATIONS

Extended European Search Report from EPO for EP application 16202261.0 received on May 4, 2017.

(Continued)

*Primary Examiner* — David Perlman
(74) *Attorney, Agent, or Firm* — Jun He Law Offices P.C.; James J. Zhu (57) ABSTRACT

An image processing method, device and medium are provided. The method includes: acquiring candidate areas from an image to be processed, each of the candidate areas including a reference target; extracting a predetermined characteristic of each of the candidate areas; calculating an evaluation value of each of the candidate areas according to the predetermined characteristic; and acquiring a snapshot of the image to be processed according to the evaluation values.

21 Claims, 8 Drawing Sheets

(56) References Cited

U.S. PATENT DOCUMENTS

| | | | |
|---|---|---|---|
| 2013/0148880 A1 | 6/2013 | Kennedy | |
| 2013/0156304 A1* | 6/2013 | Moorty | G06K 9/00711 382/159 |
| 2014/0185957 A1 | 7/2014 | Kim | |
| 2015/0279317 A1* | 10/2015 | Sakakima | G09G 5/02 345/600 |
| 2015/0288870 A1 | 10/2015 | Nagaraja et al. | |
| 2016/0104055 A1* | 4/2016 | Lin | G06T 3/0012 382/298 |
| 2017/0169314 A1* | 6/2017 | Dijkman | G06K 9/4628 |

FOREIGN PATENT DOCUMENTS

| | | |
|---|---|---|
| CN | 103905700 A | 7/2014 |
| CN | 103914689 A | 7/2014 |
| CN | 103996186 A | 8/2014 |
| CN | 104504649 A | 4/2015 |
| CN | 105528786 A | 4/2016 |
| EP | 2107787 A1 | 10/2009 |
| EP | 2429175 A2 | 3/2012 |
| EP | 2916325 A1 | 9/2015 |
| WO | 2015041641 A1 | 3/2015 |

OTHER PUBLICATIONS

ISR and written opinion of PCT application.
English Translation of the ISR.
Office action from SIPO for CN application 201510886435.5 and corresponding English translation, dated Dec. 4, 2017.
Masashi Nishiyama et al:"Sensation-based Photo Cropping", Proc. 17th ACM International Conference on Multimedia (MM '09), Beijing, China, Oct. 19, 2009(Oct. 19, 2009), pp. 669-672, XP058271494, DOI: 10.1145/1631272.1631384, ISBN:978-1-60558-608-3.
Wenyuan Yin et al:"Crowdsourced Learning to Photograph via Mobile Devices", 2012 IEEE International Conference on Multimedia and Expo (ICME), IEEE, Jul. 9, 2012(Jul. 9, 2012), pp. 812-817, XP032235781, DOI:10.1109/ICME.2012.94, ISBN:978-1-4673-1659-0.
Office Action for European Patent Application No. 16202261.0.

* cited by examiner

IMAGE PROCESSING METHOD, DEVICE AND MEDIUM

CROSS REFERENCE TO RELATED APPLICATION

This application is based upon and claims a priority to Chinese Patent Application Serial No. 201510886435.5, filed with the State Intellectual Property Office of P. R. China on Dec. 4, 2015, the entire contents of which are incorporated herein by reference.

TECHNICAL FIELD

The present disclosure generally relates to the image capturing technology, and more particularly, to an image processing method, device and medium.

BACKGROUND

At present, when a user posts a picture in a social software such as WeChat and Twitter, a pre-processing is usually performed on the picture. The image capturing is a common processing method. The "nice" part of an original picture is captured, including a target area in which the user is highly interested.

SUMMARY

Embodiments of the present disclosure provide an image processing method, device and medium.

According to a first aspect of embodiments of the present disclosure, there is provided an image processing method. The method includes: acquiring candidate areas from an image to be processed, each of the candidate areas including a reference target; extracting a predetermined characteristic of each of the candidate area; calculating an evaluation value of each of the candidate areas according to the predetermined characteristic; and acquiring a snapshot of the image to be processed according to the evaluation values.

According to a second aspect of embodiments of the present disclosure, there is provided an image processing device. The method includes: a processor; and a memory configured to store instructions executable by the processor; in which the processor is configured to: acquire candidate areas from an image to be processed, each of the candidate areas comprising a reference target; extract a predetermined characteristic of each of the candidate areas; calculate an evaluation value of each of the candidate area according to the predetermined characteristic; and acquire a snapshot of the image to be processed according to the evaluation values.

According to a third aspect of embodiments of the present disclosure, there is provided a non-transitory computer-readable storage medium having stored therein instructions that, when executed by a processor of a terminal device, cause the terminal device to perform an image processing method. The method includes: acquiring candidate areas from an image to be processed, each of the candidate areas including a reference target; extracting a predetermined characteristic of each of the candidate area; calculating an evaluation value of each of the candidate areas according to the predetermined characteristic; and acquiring a snapshot of the image to be processed according to the evaluation values.

It is to be understood that both the foregoing general description and the following detailed description are exemplary and explanatory only and are not restrictive of the present disclosure.

BRIEF DESCRIPTION OF THE DRAWINGS

The drawings shown herein, which are incorporated in and constitute a part of the specification, illustrate embodiments of the present disclosure and used for explaining the principle of the present disclosure together with the specification.

DETAILED DESCRIPTION

Now the example embodiments will be described in detail, in which the examples are shown in the accompanying drawings. In the specification with reference to the drawings, unless specified or limited otherwise, the same or similar elements and the elements having same or similar functions are denoted by like reference numerals. The implementations described in the following example embodiments do not represent all implementations of the present disclosure. Instead, they are merely examples of the device and method consistent with some aspects of the present disclosure described by the appended claims.

The technical solution provided in embodiments of the present disclosure relates to a terminal. A part of the image to be processed is automatically captured, and during the capturing, photographic composition skills and image characteristics are taken into consideration so as to reproduce the process that the photographer takes and selects a picture, also the target detection result is considered, thus preventing the complete target from being split and improving the effect of the snapshot of the image. Moreover, the user's manual operations for capturing a part of the image are reduced, such that the user experience and satisfaction are improved.

The terminal may be any device with an image recognition function, such as a mobile phone, a computer, a digital broadcasting terminal, a messaging device, a game console, a tablet device, a medical device, an exercise equipment, and a personal digital assistant, etc.

Figure 1:
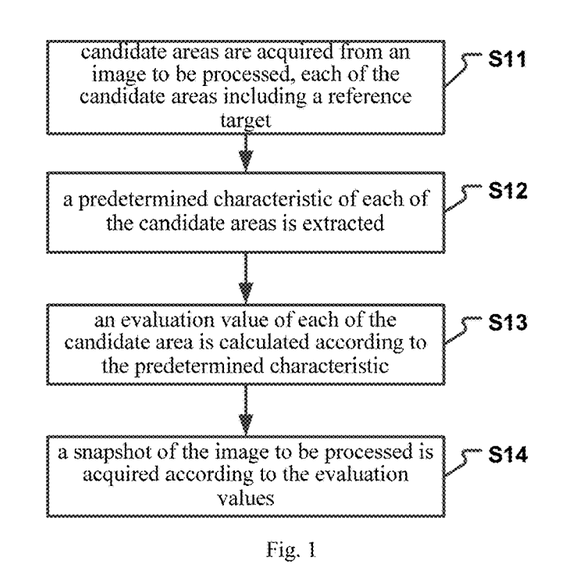
FIG. 1 shows a flow chart of an image processing method according to an example embodiment of the present disclosure.

FIG. 1 shows a flow chart of an image processing method according to an example embodiment of the present disclosure. As shown in FIG. 1, the method is applied in a terminal and includes steps as follow.

In block S11, candidate areas are acquired from an image to be processed and each of the candidate areas includes a reference target In block S12, a predetermined characteristic of each of the candidate areas is extracted.

In block S13, an evaluation value of each of the candidate areas is calculated according to the predetermined characteristic.

In block S14, a snapshot of the image to be processed is acquired according to the evaluation values.

In this embodiment, the terminal automatically captures a part of the image to be processed in various ways, and evaluates the candidate areas captured in different ways, so as to provide the snapshot with the best effect to the user, such that the accuracy and the effect of the snapshot are improved, and the user's manual operations for capturing a part of the image are reduced, thus improving the user experience and satisfaction.

Figure 2:
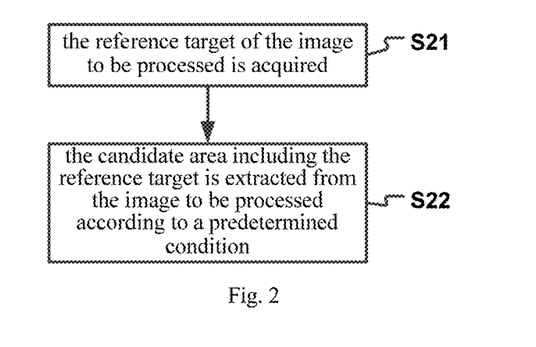
FIG. 2 shows a flow chart of an image processing method according to another example embodiment of the present disclosure.

FIG. 2 shows a flow chart of an image processing method according to another example embodiment of the present disclosure. As shown in FIG. 2, the candidate areas are acquired from the image to be processed and each of the candidate areas includes the reference target, which can be implemented as follows.

In block S21, the reference target of the image to be processed is acquired.

In block S22, the candidate area including the reference target is extracted from the image to be processed according to a predetermined condition.

The reference target of the image to be processed may be acquired in many ways as follow.

In some embodiments, the user selects the reference target.

Figure 3:
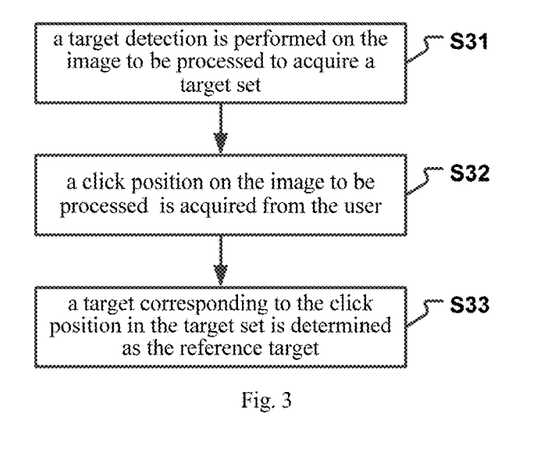
FIG. 3 shows a flow chart of an image processing method according to another example embodiment of the present disclosure.

FIG. 3 shows a flow chart of an image processing method according to another example embodiment of the present disclosure. As shown in FIG. 3, acquiring the reference target of the image to be processed includes steps as follow.

In block S31, a target detection is performed on the image to be processed so as to acquire a target set.

In block S32, a click position on the image to be processed from the user is acquired.

In block S33, a target corresponding to the click position in the target set is determined as the reference target.

Figure 4:
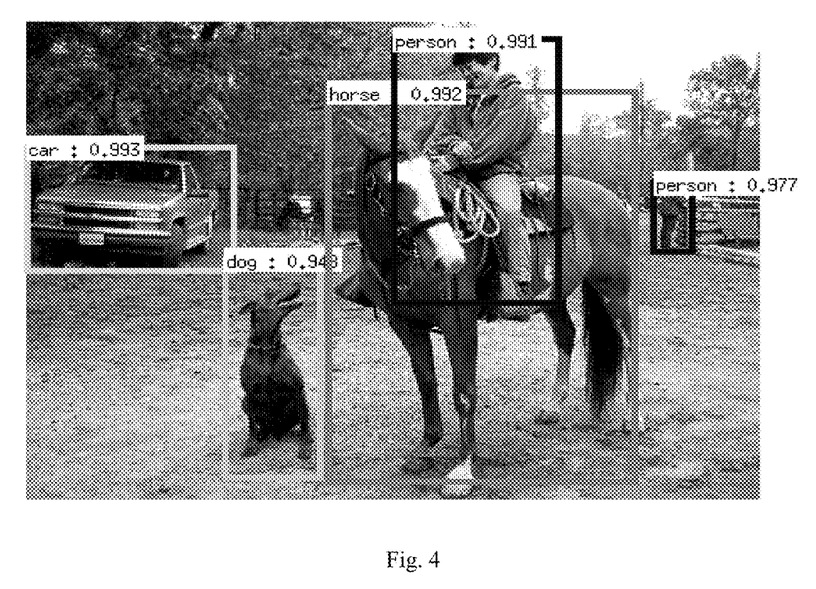
FIG. 4 shows a schematic diagram of targets in an image to be processed according to an example embodiment of the present disclosure.

For example, as shown in FIG. 4, an R-CNN (Regions Base cellular neural networks) algorithm may be adopted to select all targets in the image to be processed. The user may select by clicking the reference target to be captured on the image to be processed, and then the reference target may be determined according to the click position of the user.

In this embodiment, all the targets in the image to be processed are detected and provided to the user for selection, and then the user may select the target he/she is most interested in as the reference target.

In some embodiments, the terminal automatically detects the reference target.

Figure 5:
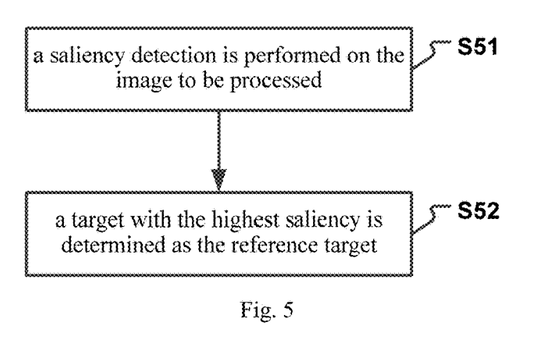
FIG. 5 shows a flow chart of an image processing method according to another example embodiment of the present disclosure.

FIG. 5 shows a flow chart of an image processing method according to another example embodiment of the present disclosure. As shown in FIG. 5, acquiring the reference target of the image to be processed includes steps as follows.

In block S51, a saliency detection is performed on the image to be processed.

In block S52, a target with the highest saliency is determined as the reference target.

For example, as shown in FIG. 4, through the saliency detection technique, it is indicated that the person riding on a horse in the image to be processed has the highest saliency, such that the person riding on the horse may be configured as the reference target.

In this embodiment, by the saliency detection, the target that the user may be most interested may be found from the image to be processed, and then the click-selection process of the user is simulated and the target with the highest saliency is configured as the reference target.

In this embodiment, by the above ways, the reference target may be acquired accurately, and the part in which the user is most interested may be found from the image to be processed, such that the accuracy of subsequently selecting the candidate areas may be improved and the snapshot may satisfy the user's demand more closely, thus bringing a better user experience.

In another embodiment, in the process of reproducing the composition of picture of the photographer with taking the photographic composition skills and image characteristics into account, the extraction of candidate areas needs to satisfy a certain predetermined condition. Extracting the candidate area including the reference target from the image to be processed according to the predetermined condition includes steps as follows.

The candidate area extracted from the image to be processed satisfies at least one of following predetermined conditions as follow.

In some embodiments, the predetermined condition is if the candidate area contains a remaining target other than the reference target, the candidate area contains a complete remaining target.

Besides the reference target, the candidate area needs to contain the complete remaining target if containing the remaining target in the image to be processed. The remaining target refers to one or more targets other than the reference target. For example, as shown in FIG. 4, the reference target is the person riding on the horse, and if the candidate image contains the horse or the dog in the neighborhood, then it needs to completely contain the horse or the dog rather than to contain a part thereof.

In some embodiments, the predetermined condition is the reference target is located at a preset position in the candidate area.

For example, the reference target needs to locate at a point of trisection or a point of golden section of the candidate area.

Both the rule of thirds and the golden section rule are basic photographic composition rules.

The theory basis of the rule of thirds is that, the sight of human always directs on a position at a two-third part of a picture naturally, such that a better effect may be acquired by locating the photograph object at a focus of trisection lines of the picture than at a center position.

The theory basis of golden section rule is that, some positions in a picture may attract sight of audients automatically. Similarly, some ratios (dedicated or coincidental) may also comfort the audients naturally. Vinci researched the concept of human on beauty and harmonious, and proposed the principle which is known as "golden section". Factually, before Vinci, Babylon, Egyptian and ancient Greek scholars have employed the golden section rule in the architecture and art.

In order to acquire "golden means", it is required to partition the picture into 9 areas with four straight lines. The principle based on which each line partitions the picture is that, the picture is portioned into two parts, one is bigger and the other one is smaller, the ratio of the edge length of the bigger part and that of the smaller part is equal to the ratio of the edge length of the whole picture and that of the bigger part. The crossover point of the four lines is the called "golden means".

In addition, the extraction of candidate areas may be in accordance with a diagonal rule, i.e., for each edge of the picture, the edge is partitioned evenly, and then one half of the edge is evenly partitioned into three sections, and some points are connected with straight lines to form the diagonal path. According to the diagonal rule, the important element is located on the diagonal path.

In this embodiment, the candidate area including the reference target is extracted from the image to be processed according to the above predetermined condition, such that the picture of the candidate area is more balanced, the expressive force of the picture is higher and the effect of capturing a part of the image is better.

Figure 6:
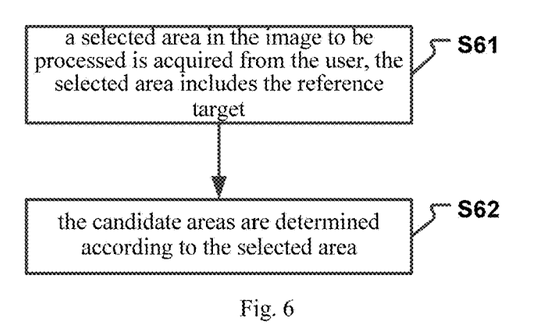
FIG. 6 shows a flow chart of an image processing method according to another example embodiment of the present disclosure.

In another embodiment, the candidate area may be selected by the user manually. FIG. 6 shows a flow chart of an image processing method according to another example embodiment of the present disclosure. As shown in FIG. 6, acquiring the candidate area including the reference target from the image to be processed includes steps as follows.

In block S61, a selected area in the image to be processed is acquired from the user, in which the selected area includes the reference target.

In block S62, the candidate areas are determined according to the selected area.

Figure 7:
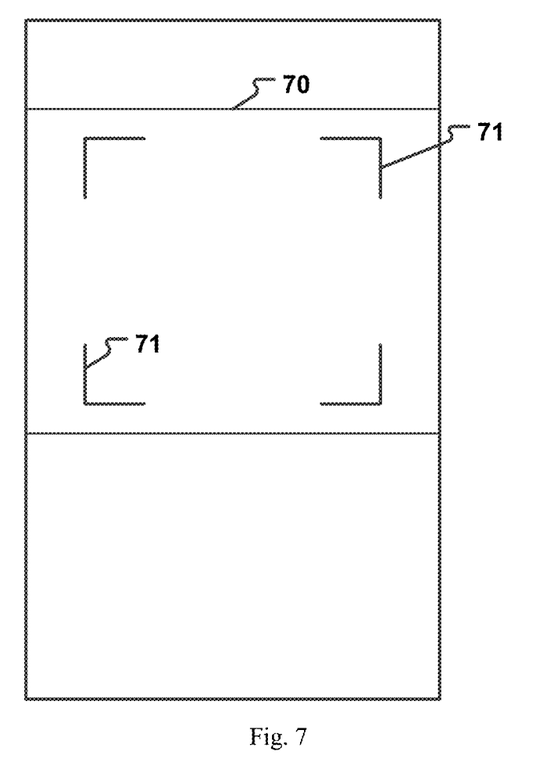
FIG. 7 shows a schematic diagram of a select box for an image to be processed according to an example embodiment of the present disclosure.

For example, as shown in FIG. 7, a movable and scalable choice box 71 is displayed on the image to be processed 70, the user may move the choice box 71 on the image to be processed 70 or change its size by dragging the boundary of the choice box 71. If the user is satisfied with the image in the range of the choice box 71, the area in the choice box 71 is determined as the candidate area.

In this embodiment, the user may select the area to be captured as he/she desires, which is easy to operate and convenient for the user. Then, the candidate area selected by the user may be evaluated so as to determine the effect of the snapshot selected by the user, such that the user experience is better.

In another embodiment, extracting the predetermined characteristic of the candidate area includes: extracting the predetermined characteristic of the reference target in the candidate area and extracting the predetermined characteristic of the candidate area.

In this embodiment, the characteristic extraction is performed for both the reference target and the whole candidate area, and the characteristics extracted from them are combined to be configured as the basis for evaluating the candidate area.

In another embodiment, calculating an evaluation value of the candidate area according to the predetermined characteristic includes: calculating the evaluation value of the candidate area according to an image evaluating model acquired in advance and the predetermined characteristic extracted, in which the predetermined image evaluating model is a model between the predetermined characteristics and the evaluation values and is acquired by training according to predetermined characteristics extracted from sample images and evaluation values of the sample images.

The predetermined image evaluating model is a model between the predetermined characteristics and the evaluation values and is acquired by training according to predetermined characteristics extracted from a sample image and an evaluation value of the sample image. The predetermined image evaluating model may include: an evaluation value corresponding to each predetermined characteristic; or a weight for calculating the evaluation value corresponding to each predetermined characteristic; or a linear or nonlinear function for calculating the evaluation value corresponding to each predetermined characteristic.

In this embodiment, by extracting the characteristic and calculating the evaluation value for the candidate area, the candidate area with the best effect may be selected as the snapshot according to the evaluation value, thus improving the user experience and the degree of satisfaction with regard to the snapshot.

In another embodiment, the snapshot of the image to be processed may be acquired according to the evaluation values in many ways as follow.

In some embodiments, the candidate area with the highest evaluation value is selected.

Figure 8:
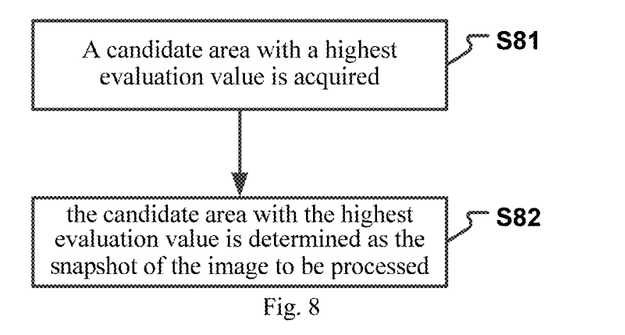
FIG. 8 shows a flow chart of an image processing method according to another example embodiment of the present disclosure.

FIG. 8 shows a flow chart of an image processing method according to another example embodiment of the present disclosure. As shown in FIG. 8, acquiring the snapshot of the image to be processed according to the evaluation value includes steps as follow.

In block S81, a candidate area with a highest evaluation value is acquired.

In block S82, the candidate area with the highest evaluation value is determined as the snapshot of the image to be processed.

In some embodiments, the user selects the snapshot from the ranked candidate areas.

Figure 9:
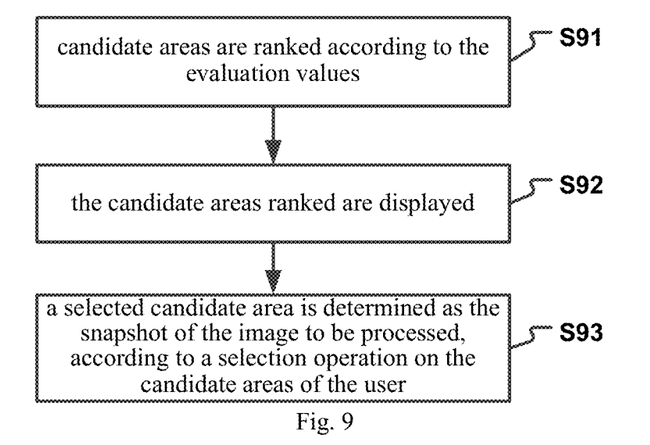
FIG. 9 shows a flow chart of an image processing method according to another example embodiment of the present disclosure.

FIG. 9 shows a flow chart of an image processing method according to another example embodiment of the present disclosure. As shown in FIG. 9, acquiring the snapshot of the image to be processed according to the evaluation values includes steps as follow.

In block S91, candidate areas are ranked according to the evaluation values.

In block S92, the candidate areas ranked are displayed.

In block S93, a selected candidate area is determined as the snapshot of the image to be processed, according to a selection operation of the user on the candidate areas.

In this embodiment, with the above ways, the finally acquired snapshot of image to be processed has the best effect and satisfies the user's demand more closely, thus improving the user experience and the degree of satisfaction with regard to the snapshot.

In another embodiment, the method further includes: acquiring the predetermined image evaluating model.

Figure 10:
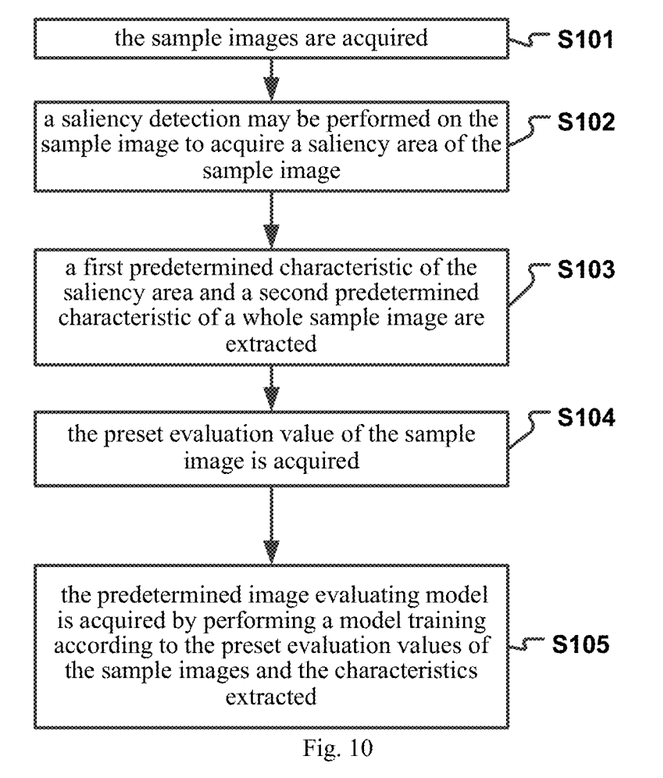
FIG. 10 shows a flow chart of an image processing method according to another example embodiment of the present disclosure.

FIG. 10 shows a flow chart of an image processing method according to another example embodiment of the present disclosure. As shown in FIG. 10, acquiring the predetermined image evaluating model includes steps as follow.

In block S101, the sample images are acquired.

In block S102, a saliency detection may be performed on each of the sample image so as to acquire a saliency area of the sample image.

In block S103, a first predetermined characteristic of the saliency area and a second predetermined characteristic of a whole sample image are extracted.

In block S104, the preset evaluation value of the sample image is acquired.

In block S105, a model training is performed according to the preset evaluation values of the sample images and the characteristics extracted, so as to acquire the predetermined image evaluating model.

In this embodiment, by calibrating all the sample images, each sample image corresponds to an evaluation value.

After characteristic extraction is performed for all the sample images, a training may be performed using SVR (support vector regress) so as to acquire the image evaluating model M.

For example, by the model training, the weight corresponding to the image characteristic is obtained as 0.8, and the weight corresponding to the photograph characteristic is obtained as 0.2. Subsequently, the evaluation value of the image to be processed may be calculated according to the weights.

In this embodiment, the predetermined image evaluating model including a correspondence between the predetermined characteristics and the evaluation values of the images is acquired by training a large number of sample images in advance, such that the candidate snapshots of image to be processed may be evaluated accurately and reliably using the predetermined image evaluating model subsequently, so as to acquire the snapshot of image to be processed according to the evaluation result.

In this embodiment, the predetermined characteristic includes at least one of an image characteristic and a photograph characteristic of an image.

The image characteristic includes at least one of a color characteristic, a grain characteristic, a shape characteristic and a space relationship characteristic.

The photograph characteristic includes at least one of an aperture when photographing, a shutter, a white balance, a photosensibility, a focus, photograph time, a photograph condition, a camera brand, a version, a color code, a voice recorded when photographing, a photograph position, and a thumbnail.

Device embodiments of the present disclosure will be described as follows, which may be used to execute the method embodiments of the present disclosure.

Figure 11:
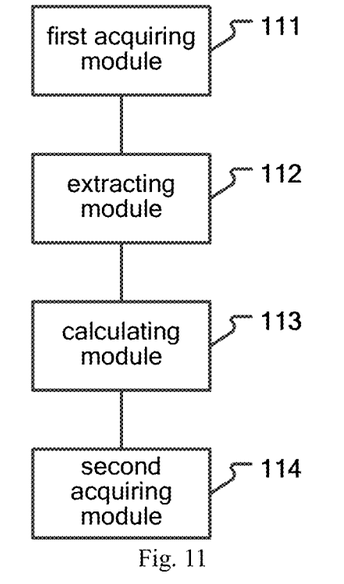
FIG. 11 shows a block diagram of an image processing device according to an example embodiment of the present disclosure.

FIG. 11 shows a block diagram of an image processing device according to an example embodiment of the present disclosure. The device may be implemented as a part or all of an electronic device via software, hardware or a combination thereof. As shown in FIG. 11, the device includes a first acquiring module 111, an extracting module 112, a calculating module 113 and a second acquiring module 114.

The first acquiring module 111 is configured to acquire candidate areas from an image to be processed, each of the candidate areas including a reference target.

The extracting module 112 is configured to extract a predetermined characteristic of each of the candidate areas acquired by the first acquiring module 111.

The calculating module 113 is configured to calculate an evaluation value of each of the candidate areas according to the predetermined characteristic extracted by the extracting module 112.

The second acquiring module 114 is configured to acquire a snapshot of the image to be processed according to the evaluation values calculated by the calculating module 113.

In this embodiment, the terminal automatically captures a part of the image to be processed in various ways, and evaluates the candidate areas captured in different ways, so as to provide the snapshot with the best effect to the user, such that the accuracy and the effect of the snapshot are improved, the user's manual operations for capturing a part of the image are reduced, thus improving the user experience and the degree of satisfaction.

Figure 12:
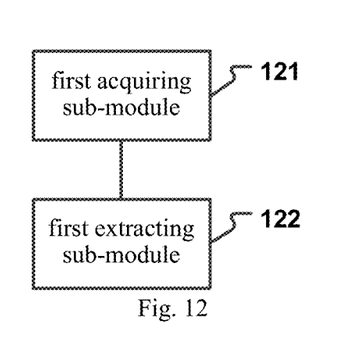
FIG. 12 shows a block diagram of a first acquiring module according to an example embodiment of the present disclosure.

FIG. 12 shows a block diagram of a first acquiring module according to an example embodiment of the present disclosure. As shown in FIG. 12, the first acquiring module 111 includes a first acquiring sub-module 121 and a first extracting sub-module 122.

The first acquiring sub-module 121 is configured to acquire the reference target of the image to be processed.

The first extracting sub-module 122 is configured to extract the candidate area including the reference target acquired by the first acquiring sub-module 121 from the image to be processed according to a predetermined condition.

The function of the first acquiring sub-module 121 may be implemented in many ways.

In some embodiments, the user selects the reference target.

The first acquiring sub-module 121 is configured to perform a target detection on the image to be processed so as to acquire a target set, to acquire a click position on the image to be processed from a user, and to determine a target corresponding to the click position in the target set as the reference target.

For example, as shown in FIG. 4, an R-CNN (Regions Base cellular neural networks) algorithm may be adopted to circle-select all targets in the image to be processed. The user may select by clicking the reference target to be captured on the image to be processed, and then the reference target may be determined according to the click position of the user.

In this embodiment, all the targets in the image to be processed are detected and provided to the user for selection, and then the user may select the target he/she is most interested in as the reference target.

In some embodiments, the terminal automatically detects the reference target.

The first acquiring sub-module 121 is configured to perform a saliency detection on the image to be processed, and to determine a target with a highest saliency as the reference target.

For example, as shown in FIG. 4, through the saliency detection method, it is indicated that the person riding on a horse in the image to be processed has the highest saliency, such that the person riding on the horse may be configured as the reference target.

In this embodiment, by the saliency detection, the target that the user may be most interested may be found in the image to be processed, and then the click-selection process of the user is simulated and the target with the highest saliency is configured as the reference target.

In this embodiment, with the above ways, the first acquiring sub-module 121 may acquire the reference target accurately and find the part that the user is most interested from the image to be processed, such that the accuracy of subsequently selecting the candidate areas may be improved and the snapshot may satisfy the user's demand more closely, thus bringing a better user experience.

In another embodiment, in the process of reproducing the composition of picture of the photographer with taking the photographic composition skills and image characteristics into account, the first extracting sub-module 122 is configured to extract the candidate area satisfying at least one of following predetermined conditions from the image to be processed.

In some embodiments, the predetermined condition is if the candidate area contains a remaining target other than the reference target acquired by the first acquiring sub-module 121, the candidate area contains a complete remaining target.

Besides the reference target, the candidate area needs to contain the complete remaining target if containing other remaining target in the image to be processed. For example, as shown in FIG. 4, the reference target is the person riding on the horse, if the candidate image contains the horse or the dog in the neighborhood, then it needs to contain the horse or the dog completely rather than to contain a part thereof.

In some embodiments, the predetermined condition is the reference target acquired by the first acquiring sub-module 121 is located at a preset position in the candidate area.

For example, the reference target needs to locate at a point of trisection or a point of golden section in the candidate area.

Both the rule of thirds and the golden section rule are basic photographic composition rules.

The theory basis of the rule of thirds is that, the sight of human always directs on a position at a two-third part of a picture naturally, such that a better effect may be acquired by locating the photograph object at a focus of trisection lines of the picture than at a center position.

The theory basis of golden section rule is that, some positions in a picture may attract sight of audients automatically. Similarly, some ratios (dedicated or coincidental) may also comfort the audients naturally. Vinci researched the concept of human on beauty and harmonious, and proposed the principle which is known as "golden section". Factually, before Vinci, Babylon, Egyptian and ancient Greek scholars have employed the golden section rule in the architecture and art.

In order to acquire "golden means", it is required to partition the picture into 9 areas with four straight lines. The principle based on which each line partitions the picture is that, the picture is portioned into two parts, one is bigger and the other one is smaller, the ratio of the edge length of the bigger part and that of the smaller part is equal to the ratio of the edge length of the whole picture and that of the bigger part. The crossover point of the four lines is the called "golden means".

In addition, the extraction of candidate areas may be in accordance with a diagonal rule, i.e., for each edge of the picture, the edge is partitioned evenly, and then one half of the edge is evenly partitioned into three sections, and some points are connected with straight lines to form the diagonal path. According to the diagonal rule, the important element is located on the diagonal path.

In this embodiment, the candidate area including the reference target is extracted from the image to be processed according to the above predetermined condition, such that the picture of the candidate area is more balanced, the expressive force of the picture is higher and the effect of capturing a part of the image is better.

Figure 13:
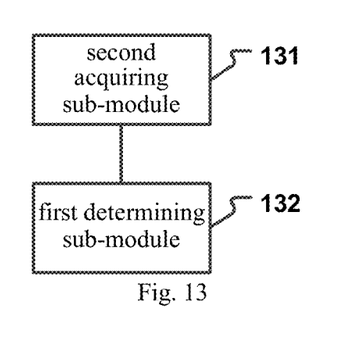
FIG. 13 shows a block diagram of a first acquiring module according to another example embodiment of the present disclosure.

In another embodiment, the candidate area may be selected by the user manually. FIG. 13 is a block diagram of a first acquiring module according to another example embodiment. As shown in FIG. 13, the first acquiring module 111 includes a second acquiring sub-module 131 and a first determining sub-module 132.

The second acquiring sub-module 131 is configured to acquire a selected area in the image to be processed from the user, the selected area including the reference target.

The first determining sub-module 132 is configured to determine the candidate areas according to the selected area acquired by the second acquiring sub-module 131.

For example, as shown in FIG. 7, a movable and scalable choice box 71 is displayed on the image to be processed 70, the user may move the choice box 71 on the image to be processed 70 or change its size by dragging the boundary of the choice box 71. If the user is satisfied with the image in the range of the choice box 71, the area in the choice box 71 is determined as the candidate area.

In this embodiment, the user may select the area to be captured as he/she desires, which is easy to operate and convenient for the user. Then, the candidate area selected by the user may be evaluated so as to determine the effect of the snapshot selected by the user, such that the user experience is better.

Alternatively, the extracting module 112 is configured to extract a predetermined characteristic of the reference target in the candidate area and to extract the predetermined characteristic of the candidate area acquired by the first acquiring module 111.

In this embodiment, the characteristic extraction is performed for both the reference target and the whole candidate area, and the characteristics extracted from them are combined to be configured as the basis for evaluating the candidate area.

Alternatively, the calculating module 113 is configured to calculate the evaluation value of the candidate area according to a predetermined image evaluating model and the predetermined characteristic extracted, in which the predetermined image evaluating model is a model between the predetermined characteristics and the evaluation values and is acquired by training according to predetermined characteristics extracted from sample images and evaluation values of the sample images.

The predetermined image evaluating model may include: an evaluation value corresponding to each predetermined characteristic; or a weight for calculating the evaluation value corresponding to each predetermined characteristic; or a linear or nonlinear function for calculating the evaluation value corresponding to each predetermined characteristic.

In this embodiment, by extracting the characteristic and calculating the evaluation value for the candidate area, the candidate area with the best effect may be selected as the snapshot according to the evaluation value, thus improving the user experience and the degree of satisfaction with regard to the snapshot.

In another embodiment, the function of the second acquiring module 131 may be implemented as follows.

In some embodiments, the candidate area with the highest evaluation value is selected.

Figure 14:
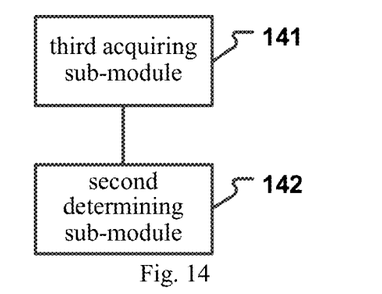
FIG. 14 shows a block diagram of a second acquiring module according to an example embodiment of the present disclosure.

FIG. 14 shows a block diagram of a second acquiring module according to an example embodiment of the present disclosure. As shown in FIG. 14, the second acquiring module 131 includes a third acquiring sub-module 141 and a second determining sub-module 142.

The third acquiring sub-module 141 is configured to acquire a candidate area with a highest evaluation value calculated by the calculating module 113.

The second determining sub-module 142 is configured to determine the candidate area with the highest evaluation value as the snapshot of the image to be processed, wherein the candidate area with the highest evaluation value is acquired by the third acquiring sub-module 141.

In some embodiments, the user selects the snapshot from the ranked candidate areas.

Figure 15:
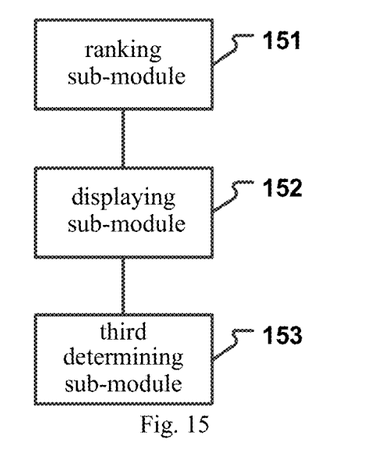
FIG. 15 shows a block diagram of a second acquiring module according to another example embodiment of the present disclosure.

FIG. 15 shows a block diagram of a second acquiring module according to another example embodiment of the present disclosure. As shown in FIG. 15, the second acquiring module 131 includes a ranking sub-module 151, a displaying sub-module 152 and a third determining sub-module 153.

The ranking sub-module 151 is configured to rank the candidate areas according to the evaluation values calculated by the calculating module 113.

The displaying sub-module 152 is configured to display the candidate areas ranked by the ranking sub-module 151.

The third determining sub-module 153 is configured to determine a selected candidate area as the snapshot of the image to be processed, according to a selection operation on the candidate areas displayed by the displaying sub-module 152 from the user.

In this embodiment, with the above ways, the finally acquired snapshot of image to be processed has the best effect and satisfies the user's demand more closely, thus improving the user experience and the degree of satisfaction with regard to the snapshot.

Figure 16:
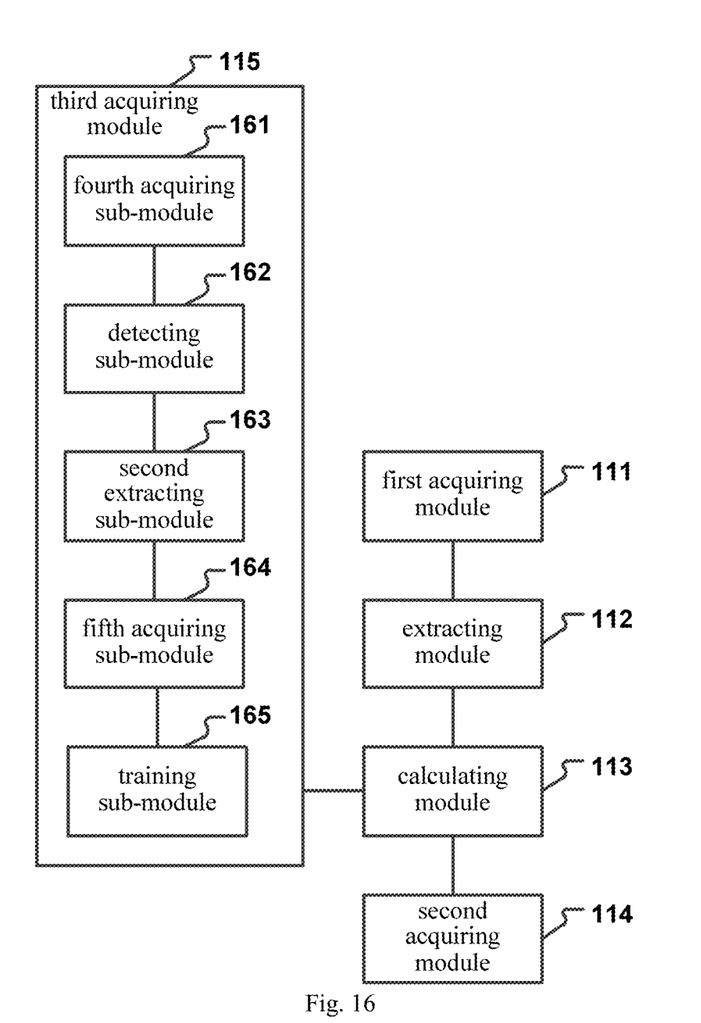
FIG. 16 shows a block diagram of an image processing device according to another example embodiment of the present disclosure.

FIG. 16 shows a block diagram of an image processing device according to another example embodiment. As shown in FIG. 16, the device further includes a third acquiring module 115 configured to acquire the predetermined image evaluating model. As shown in FIG. 16, the third acquiring module 115 includes a fourth acquiring sub-module 161, a detecting sub-module 162, a second extracting sub-module 163, a fifth acquiring sub-module 164 and a training sub-module 165.

The fourth acquiring sub-module 161 is configured to acquire the sample images.

The detecting sub-module 162 is configured to perform a saliency detection on each of the sample images acquired by the fourth acquiring sub-module 161 so as to acquire a saliency area of the sample image.

The second extracting sub-module 163 is configured to extract a first predetermined characteristic of the saliency area detected by the detecting sub-module 162 and a second predetermined characteristic of a whole sample image.

The fifth acquiring sub-module 164 is configured to acquire the preset evaluation value of the sample image.

The training sub-module 165 is configured to acquire the predetermined image evaluating model by performing a model training according to the preset evaluation values of the sample images acquired by the fifth acquiring sub-module 164 and the characteristics extracted by the second extracting sub-module 163.

For example, by the model training, the weight corresponding to the image characteristic is obtained as 0.8, and the weight corresponding to the photograph characteristic is obtained as 0.2. Subsequently, the evaluation value of the image to be processed may be calculated according to the weights.

In this embodiment, the predetermined image evaluating model including a correspondence between the predetermined characteristics and the evaluation values of the images is acquired by training a large number of sample images in advance, such that the candidate snapshots of image to be processed may be evaluated accurately and reliably using the predetermined image evaluating model subsequently, so as to acquire the snapshot of image to be processed according to the evaluation result.

Alternatively, the predetermined characteristic extracted by the extracting module 112 includes at least one of an image characteristic and a photograph characteristic of an image.

The image characteristic includes at least one of a color characteristic, a grain characteristic, a shape characteristic and a space relationship characteristic.

The photograph characteristic includes at least one of an aperture when photographing, a shutter, a white balance, a photosensibility, a focus, photograph time, a photograph condition, a camera brand, a version, a color code, a voice recorded when photographing, a photograph position, and a thumbnail.

The present disclosure also provides an image processing device, including: a processor; and a memory configured to store instructions executable by the processor, in which the processor is configured to: acquire candidate areas from an image to be processed, each of the candidate areas including a reference target; extract a predetermined characteristic of each of the candidate areas; calculate an evaluation value of each of the candidate areas according to the predetermined characteristic; and acquire a snapshot of the image to be processed according to the evaluation values.

Figure 17:
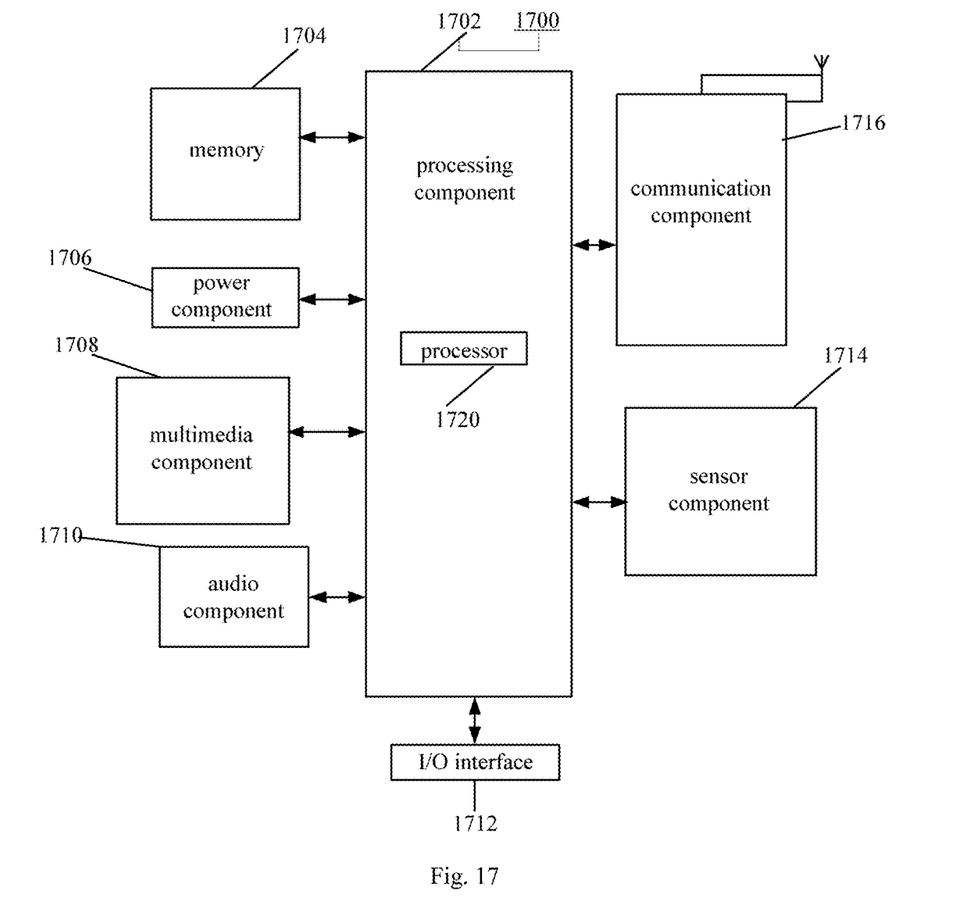
FIG. 17 shows a block diagram of a device for processing an image according to an example embodiment of the present disclosure.

FIG. 17 shows a block diagram of a device for processing an image according to an example embodiment of the present disclosure. The device is suitable for a terminal device. For example, the device 1700 may be a camera, a recording device, a mobile phone, a computer, a digital broadcasting terminal, a messaging device, a game console, a tablet device, a medical device, an exercise equipment, and a personal digital assistant, etc.

The device 1700 may include one or more of following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1708 includes a front camera and/or a rear camera. The front camera and the rear camera may receive external multimedia data while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700 and relative positioning of components (e.g., the display and the keypad of the device 1700). The sensor component 1714 may also detect a change in position of the device 1700 or of a component in the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate wired or wireless communication between the device 1700 and other devices. The device 1700 can access a wireless network based on a communication standard, such as WIFI, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1704 including instructions. The above instructions are executable by the processor 1720 in the device 1700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium including instructions, that when executed by a processor of the device 1700, the device 1700 may perform the above-mentioned image processing method, in which the method includes: acquiring candidate areas from an image to be processed, each of the candidate areas including a reference target; extracting a predetermined characteristic of each of the candidate areas; calculating an evaluation value of each of the candidate areas according to the predetermined characteristic; and acquiring a snapshot of the image to be processed according to the evaluation values.

Alternatively, acquiring candidate areas from an image to be processed includes: acquiring the reference target of the image to be processed; and extracting the candidate area including the reference target from the image to be processed according to a predetermined condition.

Alternatively, acquiring the reference target of the image to be processed includes: performing a target detection on the image to be processed so as to acquire a target set; acquiring a click position on the image to be processed from a user; and determining a target corresponding to the click position in the target set as the reference target.

Alternatively, acquiring the reference target of the image to be processed includes: performing a saliency detection on the image to be processed; and determining a target with a highest saliency as the reference target.

Alternatively, extracting the candidate area including the reference target from the image to be processed according to a predetermined condition includes: extracting the candidate area satisfying at least one of following predetermined conditions from the image to be processed: if the candidate area includes a remaining target other than the reference target, the candidate area includes a complete remaining target; the reference target is located at a preset position of the candidate area.

Alternatively, acquiring candidate areas from an image to be processed includes: acquiring a selected area in the image to be processed from the user, the selected area comprising the reference target; and determining the candidate areas according to the selected area.

Alternatively, extracting a predetermined characteristic of each of the candidate areas includes: extracting a predetermined characteristic of the reference target in the candidate area and extracting the predetermined characteristic of the candidate area.

Alternatively, acquiring a snapshot of the image to be processed according to the evaluation values includes: acquiring a candidate area with a highest evaluation value; and determining the candidate area with the highest evaluation value as the snapshot of the image to be processed.

Alternatively, acquiring a snapshot of the image to be processed according to the evaluation values includes: ranking the candidate areas according to the evaluation values; displaying the candidate areas ranked; and determining a selected candidate area as the snapshot of the image to be processed, according to a selection operation on the candidate areas of the user.

Alternatively, calculating an evaluation value of the candidate area according to the predetermined characteristic includes: calculating the evaluation value of the candidate area according to a predetermined image evaluating model and the predetermined characteristic extracted, in which the predetermined image evaluating model is a model between the predetermined characteristics and the evaluation values and is acquired by training according to predetermined characteristics extracted from sample images and evaluation values of the sample images.

Alternatively, the method further includes: acquiring the sample images; performing a saliency detection on each of the sample images so as to acquire a saliency area of the sample image; extracting a first predetermined characteristic of the saliency area and a second predetermined characteristic of a whole sample image; acquiring the preset evaluation value of the sample image; and acquiring the predetermined image evaluating model by performing a model training according to the preset evaluation values of the sample images and the characteristics extracted.

Alternatively, the predetermined characteristic includes at least one of an image characteristic and a photograph characteristic of an image; the image characteristic includes at least one of a color characteristic, a grain characteristic, a shape characteristic and a space relationship characteristic; the photograph characteristic includes at least one of an aperture when photographing, a shutter, a white balance, a photosensibility, a focus, photograph time, a photograph condition, a camera brand, a version, a color code, a voice recorded when photographing, a photograph position and a thumbnail.

Other embodiments will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing form the scope thereof. It is intended that the scope of the invention only be limited by the appended claims.

What is claimed is:

1. An image processing method, comprising:
    acquiring candidate areas from an image to be processed, each of the candidate areas comprising a reference target;
    extracting a predetermined characteristic of each of the candidate areas, wherein the predetermined characteristic comprises at least one of a color characteristic, a grain characteristic, a shape characteristic and a space relationship characteristic;
    calculating an evaluation value of each of the candidate areas according to the predetermined characteristic; and
    acquiring a snapshot of the image to be processed according to the evaluation values,
    wherein acquiring candidate areas from an image to be processed comprises:
        acquiring the reference target of the image to be processed; and
        extracting the candidate area comprising the reference target from the image to be processed according to a predetermined condition, wherein the predetermined condition comprises: if the candidate area comprises a portion of a remaining target other than the reference target, the candidate area is adjusted to comprise entirety of the remaining target; and
    wherein calculating an evaluatiojn value of each of the candidate areas according to the predetermined characteristic comprises:
        calculating the evaluation value of the candidate area according to a predetermined image evaluating model and the predetermined characteristic extracted from the candidate area, wherein the predetermined image evaluating model is a model between predetermined characteristics and evaluation values and is acquired by training according to predetermined characteristics extracted from sample images and evaluation values of the sample images.

2. The method according to claim 1, wherein acquiring the reference target of the image to be processed comprises:
    performing a target detection on the image to be processed to acquire a target set;
    acquiring a click position on the image to be processed from a user; and
    determining a target corresponding to the click position in the target set as the reference target.

3. The method according to claim 1, wherein acquiring the reference target of the image to be processed comprises:
    performing a saliency detection on the image to be processed; and
    determining a target with a highest saliency as the reference target.

4. The method according to claim 1, wherein the predetermined condition further comprises:
    the reference target is located at a preset position in the candidate area.

5. The method according to claim 1, wherein acquiring candidate areas from an image to be processed comprises:
    acquiring a selected area in the image to be processed from the user, the selected area comprising the reference target; and
    determining the candidate areas according to the selected area.

6. The method according to claim 1, wherein extracting a predetermined characteristic of each of the candidate areas comprises:

extracting a predetermined characteristic of the reference target in the candidate area; and
extracting the predetermined characteristic of the candidate area.

7. The method according to claim 1, wherein acquiring a snapshot of the image to be processed according to the evaluation values comprises:
acquiring an candidate area with a highest evaluation value; and
determining the candidate area with the highest evaluation value as the snapshot of the image to be processed.

8. The method according to claim 1, wherein acquiring a snapshot of the image to be processed according to the evaluation values comprises:
ranking the candidate areas according to the evaluation values;
displaying the candidate areas ranked; and
determining a selected candidate area as the snapshot of the image to be processed, according to a selection operation on the candidate areas from the user.

9. The method according to claim 1, further comprising:
acquiring the sample images;
acquiring a saliency area of each of the sample images;
extracting a first predetermined characteristic of the saliency area and a second predetermined characteristic of a whole sample image;
acquiring a preset evaluation value of the sample image; and
acquiring the predetermined image evaluating model by performing a model training according to the preset evaluation values of the sample image and the predetermined characteristics extracted.

10. The method according to claim 1, wherein the predetermined characteristic comprises:
a photograph characteristic of an image comprising at least one of an aperture when photographing, a shutter, a white balance, a photosensibility, a focus, photograph time, a photograph condition, a camera brand, a version, a color code, a voice recorded when photographing, a photograph position, and a thumbnail.

11. An image processing device, comprising:
a processor; and
a memory configured to store instructions executable by the processor;
wherein the processor is configured to:
acquire candidate areas from an image to be processed, each of the candidate areas comprising a reference target;
extract a predetermined characteristic of each of the candidate areas, wherein the predetermined characteristic comprises at least one of a color characteristic, a grain characteristic, a shape characteristic and a space relationship characteristic;
calculate an evaluation value of each of the candidate areas according to the predetermined characteristic; and
acquire a snapshot of the image to be processed according to the evaluation values,
wherein the processor configured to acquire candidate areas from an image to be processed is further configured to:
acquire the reference target of the image to be processed; and
extract the candidate area comprising the reference target from the image to be processed according to a predetermined condition, wherein the predetermined condition comprises: if the candidate area comprises a portion of a remaining target other than the reference target, the candidate area is adjusted to comprise entirety of the remaining target; and wherein calculating an evaluation value of each of the candidate areas according to the predetermined characteristic comprises:
calculating the evaluation value of the candidate area according to a predetermined image evaluating model and the predetermined characteristic extracted from the candidate area, wherein the predetermined image evaluating model is a model between predetermined characteristics and evaluation values and is acquired by training according to predetermined characteristics extracted from sample images and evaluation values of the sample images.

12. The image processing device according to claim 11, wherein the processor configured to acquire the reference target of the image to be processed is further configured to:
perform a target detection on the image to be processed to acquire a target set;
acquire a click position on the image to be processed from a user; and
determine a target corresponding to the click position in the target set as the reference target.

13. The image processing device according to claim 11, wherein the processor configured to acquire the reference target of the image to be processed is further configured to:
perform a saliency detection on the image to be processed; and
determine a target with a highest saliency as the reference target.

14. The image processing device according to claim 11, wherein the predetermined condition further comprises:
the reference target is located at a preset position in the candidate area.

15. The image processing device according to claim 11, wherein the processor configured to acquire candidate areas from an image to be processed is further configured to:
acquire a selected area in the image to be processed from the user, the selected area comprising the reference target; and
determine the candidate areas according to the selected area.

16. The image processing device according to claim 11, wherein the processor configured to extract a predetermined characteristic of each of the candidate areas is further configured to:
extract a predetermined characteristic of the reference target in the candidate area; and
extract the predetermined characteristic of the candidate area.

17. The image processing device according to claim 11, wherein the processor configured to acquire a snapshot of the image to be processed according to the evaluation values is further configured to:
acquire an candidate area with a highest evaluation value; and
determine the candidate area with the highest evaluation value as the snapshot of the image to be processed.

18. The image processing device according to claim 11, wherein the processor configured to acquire a snapshot of the image to be processed according to the evaluation values is further configured to:
rank the candidate areas according to the evaluation values;
display the candidate areas ranked; and
determine a selected candidate area as the snapshot of the image to be processed, according to a selection operation from the user on the candidate areas displayed.

19. The image processing device according to claim 11, wherein the processor configured to calculate an evaluation value of each of the candidate areas according to the predetermined characteristic is further configured to:

calculate the evaluation value of the candidate area according to a predetermined image evaluating model and the predetermined characteristic extracted from the candidate area, wherein the predetermined image evaluating model is a model between predetermined characteristics and evaluation values and is acquired by training according to predetermined characteristics extracted from sample images and evaluation values of the sample images.

20. The image processing device according to claim 19, wherein the processor is configured to:
   acquire the sample images;
   acquire a saliency area of each of the sample images;
   extract a first predetermined characteristic of the saliency area and a second predetermined characteristic of a whole sample image;
   acquire a preset evaluation value of the sample image; and
   acquire the predetermined image evaluating model by performing a model training according to the preset evaluation values of the sample images and the first predetermined characteristics and the second predetermined characteristics.

21. A non-transitory computer-readable storage medium having stored therein instructions that, when executed by a processor of a terminal device, cause the terminal device to perform an image processing method, the method comprising:
   acquiring candidate areas from an image to be processed, each of the candidate areas comprising a reference target;
   extracting a predetermined characteristic of each of the candidate areas, wherein the predetermined characteristic comprises at least one of a color characteristic, a grain characteristic, a shape characteristic and a space relationship characteristic;
   calculating an evaluation value of each of the candidate area according to the predetermined characteristic; and
   acquiring a snapshot of the image to be processed according to the evaluation values,
   wherein acquiring candidate areas from an image to be processed comprises:
      acquiring the reference target of the image to be processed; and
      extracting the candidate area comprising the reference target from the image to be processed according to a predetermined condition, wherein the predetermined condition comprises: if the candidate area comprises a portion of a remaining target other than the reference target, the candidate area is adjusted to comprise entirety of the remaining target; and
   wherein calculating an evaluation value of each of the candidate areas according to the predetermined characteristic comprises:
      calculating the evaluation value of the candidate area according to a predetermined image evaluating model and the predetermined characteristic extracted from the candidate area, wherein the predetermined image evaluating model is a model between predetermined characteristics and evaluation values and is acquired by training according to predetermined characteristics extracted from sample images and evaluation values of the sample images.

* * * * *